Feb. 21, 1933.      A. D. GARDNER      1,898,659

PUMP

Filed March 20, 1929

INVENTOR
Archibald D. Gardner
BY Chappell & Earl
ATTORNEYS

Patented Feb. 21, 1933

1,898,659

UNITED STATES PATENT OFFICE

ARCHIBALD D. GARDNER, OF JACKSON, MICHIGAN, ASSIGNOR TO AUTOMOTIVE FAN & BEARING COMPANY, OF JACKSON, MICHIGAN

PUMP

Application filed March 20, 1929. Serial No. 348,385.

The main objects of this invention are:

First, to provide a pump for the circulating of lubricant to bearings and the like which is very compact and at the same time is very efficient.

Second, to provide a pump which is very economical in structure and at the same time very durable.

Objects relating to details and economies of my invention will appear from the description to follow. The invention is defined and pointed out in the claims.

A structure which is a preferred embodiment of my invention is illustrated in the accompanying drawing, in which.

Figure 1:
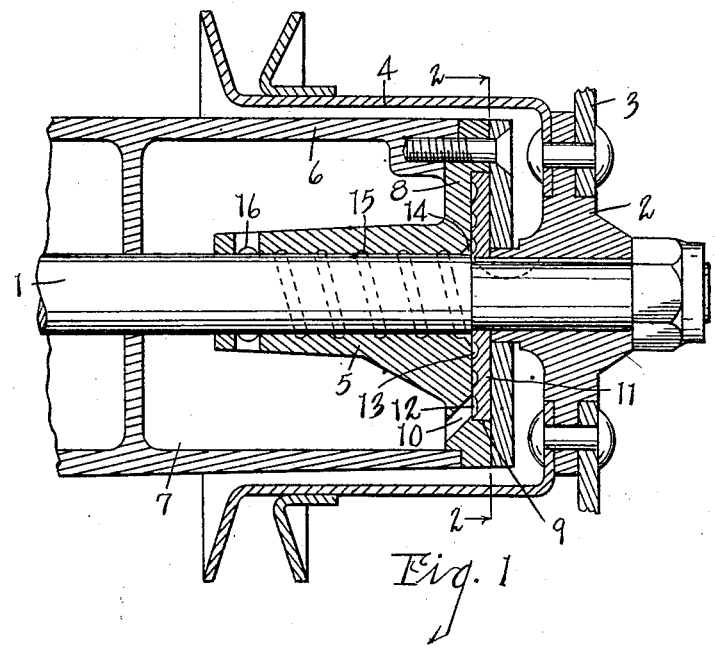
Fig. 1 is a fragmentary view of a pulley structure embodying the features of my invention mainly in central longitudinal section on line 1—1 of Fig. 2.
Figure 2:
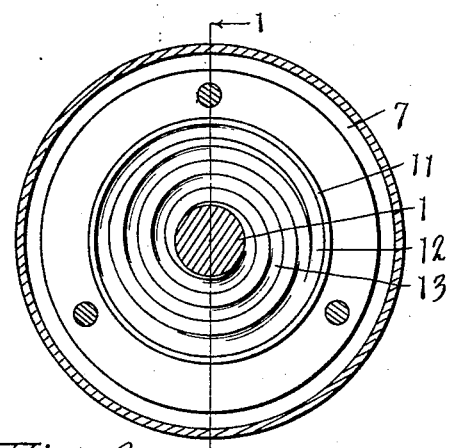
Fig. 2 is a transverse section on line 2—2 of Fig. 1.

In the embodiment illustrated, 1 represents a shaft having a hub 2 thereon in which the driven element 3 such as an automobile radiator fan is mounted. The pulley 4 is also mounted on this hub.

The shaft is supported in a bearing 5 surrounded by a housing 6 providing a lubricant reservoir 7, this housing constituting a support for the bearing.

The bearing has a disc-like head 8 constituting an end wall for the lubricant reservoir, this head having a cylindrical chamber 9 therein and constituting the outer member of a pump.

The chamber 9 has an inlet 10 opening at the periphery thereof and to the bottom of the lubricant reservoir.

On the shaft, I mount a disc-like impeller 11 so that it rotates within the chamber 9, this impeller being provided with an annular groove 12 in the inner face thereof to which the inlet 10 opens. A spiral groove 13 leads from this annular groove to the bearing, the end of which is beveled at 14 to provide a free discharge from the pump chamber to the bearing.

The bearing is preferably provided with a helical distributing groove 15 having a lead from the discharge of the pump. This groove, when the shaft rotates therein, also constitutes a pump; that is, the lubricant is drawn along and distributed throughout the length of the bearing and returned to the reservoir through the radial openings 16.

My improved pump is very efficient, at the same time is simple and economical in structure and readily embodied in bearings of relatively small size. My pump is, however, adapted for use in other relations than that of a lubricant circulating pump.

Having thus described my invention, what I claim as new and desire to secure by Letters Patent, is:

1. The combination of a bearing provided with a chambered head, a lubricant receptacle surrounding said bearing, the chamber of said head having an inlet opening to said lubricant receptacle, a shaft disposed in said bearing, and a disc-like impeller on said shaft having an annular groove to which said inlet opens and a spiral groove leading from said annular groove to the bearing, said bearing having a helical lubricant distributing groove therein with a lead from said impeller.

2. The combination of a bearing provided with a chambered head, a stationary lubricant receptacle surrounding said bearing, the chamber of said head having an inlet opening leading into the bottom of said lubricant receptacle, a shaft disposed in said bearing, and a disc-like impeller on said shaft having a spiral groove in one face thereof and connected at all times with said opening, said bearing having a helical lubricant distributing groove therein with a lead from said impeller.

3. A pump comprising an outer chambered member having a peripheral inlet and a central discharge, and an impeller rotatable in said chamber and provided with an annular peripheral groove continuously in contact with said inlet, said impeller having a spiral passage leading from said groove to the discharge.

4. A pump for oiling a bearing member comprising an outer chambered member having an inlet opening into the bottom of said chambered member and a central discharge, and an impeller rotatable in said chamber and provided with a spiral passage in one face thereof and connected at all times with said opening.

5. In self-oiling fan bearings, a stationary housing having an inner bearing member therefrom spaced by a radial flange to form an oil reservoir, a shaft in said bearing member, a pump disc on said shaft having a spiral groove in one side, means cooperating with said flange to form a housing for said disc having an inlet leading into the bottom portion of said reservoir and an outlet leading to the bearing surface between said shaft and member, the grooved side of said disc adapted to contact with the side of the housing.

In witness whereof I have hereunto set my hand.

ARCHIBALD D. GARDNER.